(12) United States Patent
Zhai et al.

(10) Patent No.: US 10,666,519 B2
(45) Date of Patent: May 26, 2020

(54) DETERMINING A PHYSICAL POSITION OF AN ELECTRONIC DEVICE

(71) Applicant: EMC IP Holding Company LLC, Hopkinton, MA (US)

(72) Inventors: Haifang Zhai, Shanghai (CN); Hendry Wu, Shanghai (CN); David Dong, Shanghai (CN); Yujie Zhou, Shanghai (CN); Peter Yuanhang Pan, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 35 days.

(21) Appl. No.: 15/662,353

(22) Filed: Jul. 28, 2017

(65) Prior Publication Data

US 2018/0034705 A1    Feb. 1, 2018

(30) Foreign Application Priority Data

Jul. 29, 2016    (CN) .......................... 2016 1 0619574

(51) Int. Cl.
*H04L 12/24*    (2006.01)
*G06K 7/10*    (2006.01)
(Continued)

(52) U.S. Cl.
CPC .......... *H04L 41/12* (2013.01); *G06K 7/10366* (2013.01); *H04B 5/0031* (2013.01); *H04W 4/80* (2018.02); *Y04S 40/164* (2013.01)

(58) Field of Classification Search
CPC ......... H04L 12/24; H04L 41/12; H04L 29/12; H04L 41/0618; H04L 41/0677; H04L 12/46; H04L 29/08; H04L 67/18; H04L 12/66; H04W 4/33; H04W 4/80; H04W 4/02; H04W 4/023; H04B 5/0031; (Continued)

(56) References Cited

U.S. PATENT DOCUMENTS 3,922,492 A * 11/1975 Lumsden ............. H04M 11/002
                                                  379/106.07
2005/0278082 A1* 12/2005 Weekes .................. G07C 5/008
                                                              701/1
(Continued)

FOREIGN PATENT DOCUMENTS

CN    101690003 A    3/2010
CN    103489229 A    1/2014
(Continued)

*Primary Examiner* — Jeffrey M Rutkowski
*Assistant Examiner* — Sudesh M Patidar
(74) *Attorney, Agent, or Firm* — Ryan, Mason & Lewis, LLP

(57) ABSTRACT

Embodiments of the present disclosure provide a method and device for determining a physical position of an electronic device. The method comprises obtaining, at a power distribution unit (PDU) that provides power supply for the electronic device, a position identifier of a physical position of the PDU from a radio frequency (RF) tag reader. The method further comprises providing to a computing device the position identifier, a network address of the PDU and a network address of the electronic device associated with the network address of the PDU so that the computing device determines the physical position of the electronic device.

20 Claims, 6 Drawing Sheets

(51) Int. Cl.
*H04W 4/80* (2018.01)
*H04B 5/00* (2006.01)

(58) Field of Classification Search
CPC ............. G06K 7/10; G06K 7/10366; H05K
2201/10434; H04S 7/303; G05B 9/02
See application file for complete search history.

(56) References Cited

U.S. PATENT DOCUMENTS

| | | | |
|---|---|---|---|
| 2006/0153167 A1* | 7/2006 | Schunemann | H04L 29/1216 370/352 |
| 2008/0317021 A1* | 12/2008 | Ives | H04L 12/10 370/389 |
| 2011/0035471 A1* | 2/2011 | Ratcliff | G06F 1/266 709/220 |
| 2011/0291813 A1* | 12/2011 | Jansma | G06F 1/266 340/10.5 |
| 2014/0329467 A1* | 11/2014 | Ewing | H04B 1/3827 455/41.2 |
| 2017/0097671 A1* | 4/2017 | Hutchison | G06F 1/266 |

FOREIGN PATENT DOCUMENTS

| | | |
|---|---|---|
| CN | 103926612 A | 7/2014 |
| CN | 204613978 U | 9/2015 |
| CN | 105229561 A | 1/2016 |
| CN | 105335258 A | 2/2016 |
| CN | 2016106195746 | 10/2019 |

* cited by examiner

DETERMINING A PHYSICAL POSITION OF AN ELECTRONIC DEVICE

RELATED APPLICATIONS

This application claim priority from Chinese Patent Application Number CN201610619574.6, filed on Jul. 29, 2016 at the State Intellectual Property Office, China, titled "DETERMINING PHYSICAL LOCATION OF ELECTRONIC DEVICE" the contents of which is herein incorporated, by reference in its entirety.

FIELD

Embodiments of the present disclosure generally relate to locating of an electronic device, and more specifically, to a method and device for determining a physical position of an electronic device.

BACKGROUND

A large number of electronic devices have been widely used in data center environments such as computer rooms, control centers, network wiring closets and the like. Examples of electronic devices may include, but are not limited to, servers, storage devices, routers, switches, and monitors. With the increase of electronic devices, determining a physical position of an electronic device is of vital importance to system maintenance, hardware configuration change, hardware failure diagnosis, application migration, etc. For example, when an electronic device in a data center fails, device administrators need to correctly and rapidly find the electronic device from a large number of electronic devices so as to recover or replace the electronic device.

SUMMARY

Embodiments of the present disclosure provide a method and device for determining a physical position of an electronic device.

In a first, aspect, there is provided a method of determining a physical position of an electronic device. The method comprises obtaining, at a power distribution unit (PDU) that provides power supply for the electronic device, a position identifier of a physical position of the PDU from a radio frequency (RF) tag reader. The method further comprises providing to a computing device the position identifier, a network, address of the PDU and a network address of the electronic device associated with the network address of the PDU for determining the physical position of the electronic device by the computing device.

In some embodiments, obtaining the position identifier from the RF tag reader comprises obtaining the position identifier from the RF tag reader in response to the PDU being enabled to provide power supply for the RF tag reader.

In some embodiments, obtaining the position identifier from the RF tag reader comprises obtaining the position identifier from at least one of: a near field communication (NFC) tag reader; and a radio frequency identification (RFID) tag reader.

In some embodiments, providing the position identifier comprises: in response to the obtained position identifier being different from a position identifier that is stored at the PDU, providing the obtained position identifier.

In a second aspect, there is provided a method of determining a physical position of an electronic device. The method comprises obtaining a network address of the electronic device. The method further comprises determining the physical position of the electronic device based on an address mapping. The address mapping indicates mapping relationships among a position identifier of a physical position of a power distribution unit (PDU) that provides power supply for the electronic device, a network address of the PDU and the network address of the electronic device associated with the network address of the PDU, the position identifier being obtained from the PDU.

In a third aspect, there is provided a PDU. The PDU provides power supply for an electronic device and comprises a controller and a memory coupled to the controller and cooperating with the controller to cause the PDU to: obtain a position identifier of a physical position of the PDU from an radio frequency (RF) tag reader; and provide to a computing device the position identifier, a network address of the PDU, as well as a network address of the electronic device associated with the network address of the PDU for determining the physical position of the electronic device by the computing device.

In a fourth aspect, there is provided a computing device. The computing device comprises at least one processor and at least one memory. The at least one memory is coupled to the at least one processor and stores instructions to be executed by the at least one processor. The instructions, when executed by the at least one processor, cause the computing device to: obtain a network address of an electronic device and determine a physical position of the electronic device based on an address mapping, the address mapping indicating mapping relationships among a position identifier of a physical position of a power distribution unit (PDU) supplying power to the electronic device as obtained from the PDU, a network address of the PDU, as well as the network address of the electronic device associated with the network address of the PDU.

In other aspects, there is provided a computer program product. The computer program product is tangibly stored on a non-transitory computer readable medium and comprises machine executable instructions. The instructions, when executed, cause a machine to perform steps of the methods described above.

BRIEF DESCRIPTION OF THE DRAWINGS

Through the more detailed description of example embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Example embodiments of the present disclosure will be described in more detail with reference to the accompanying drawings, in which the example embodiments of the present disclosure have been illustrated. However, it is to be understood the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As used herein, the term "includes" and its variants are to be read as open terms that mean "includes, but is not limited to." The term "based on" is to be read as "based at least in part on." The terms "one example embodiment" and "an embodiment" are to be read as "at least one example." The term "another embodiment" is to be read as "at least one other embodiment." The terms "first," "second," and the like may refer to different or same objects. Other definitions, explicit and implicit, may be included below.

Traditionally, a fixed network address may be bound to a physical position of an electronic device so that the physical position of the electronic device may be determined by tracking its network address. However, as the Dynamic Host Configuration Protocol (DHCP) has introduced the dynamic allocation of network addresses, it is difficult to determine a physical position of an electronic device by tracking a dynamic network address. If fixed network addresses are applied to different physical positions, the migration of electronic devices will be prevented.

Figure 1:
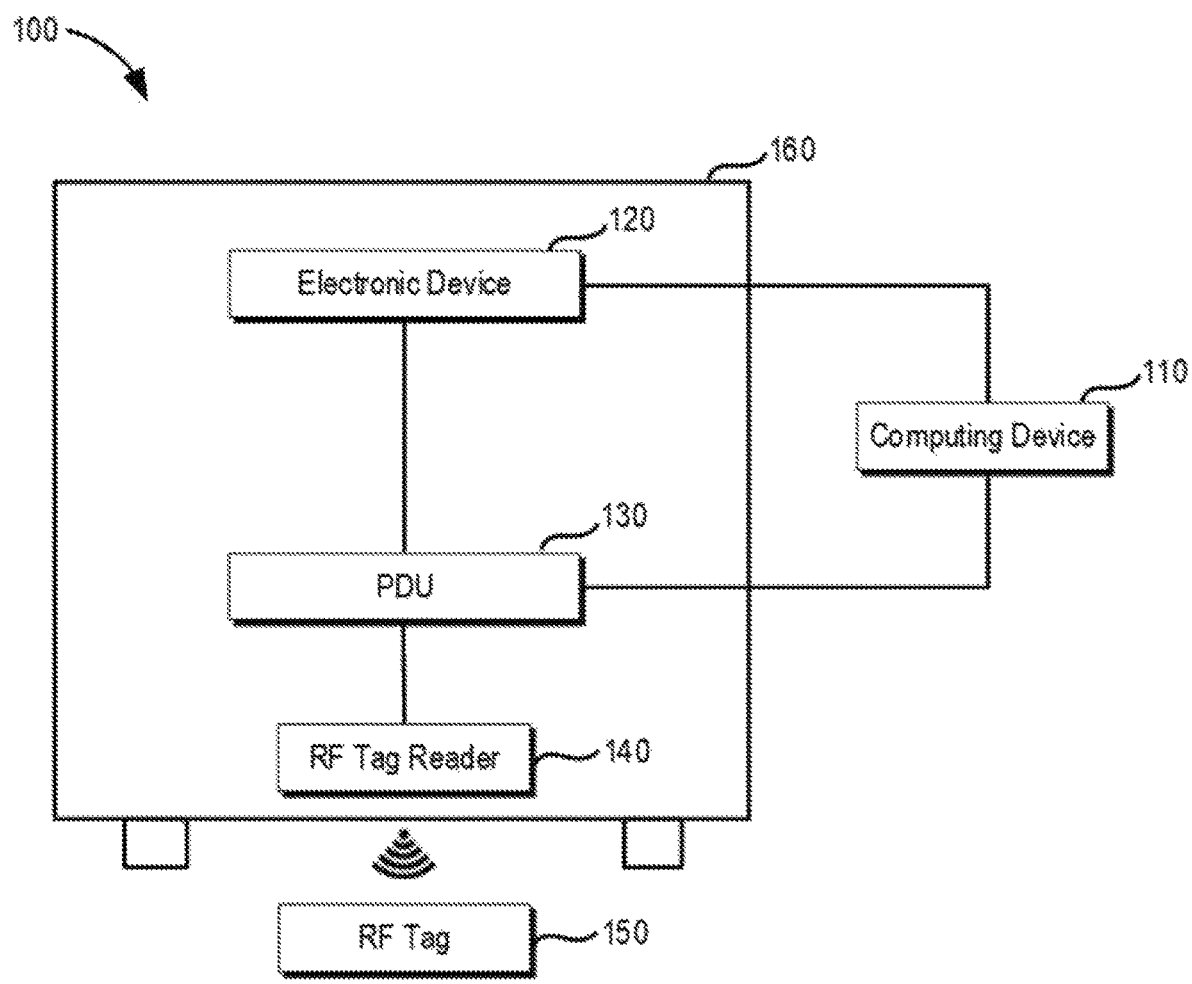
FIG. 1 shows a block diagram of an environment in which the embodiments of the present disclosure may be implemented.
Figure 2:
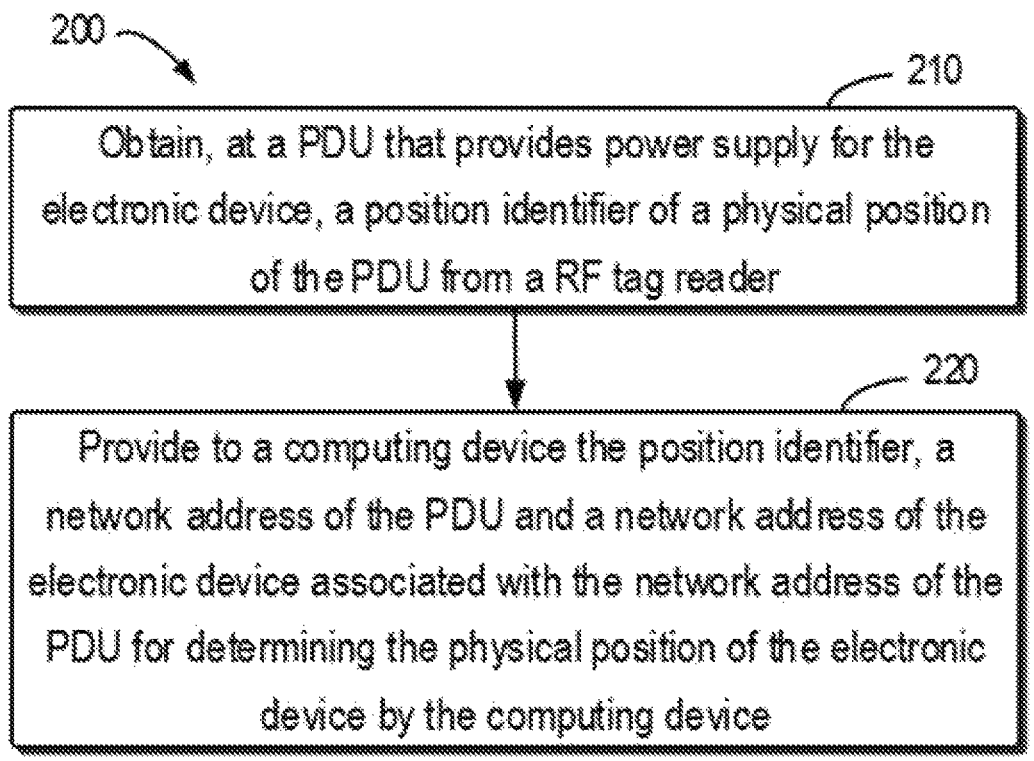
FIG. 2 shows a flowchart of a method of determining a physical position of an electronic device as implemented in a PDU according to an embodiment of the present disclosure.
Figure 3:
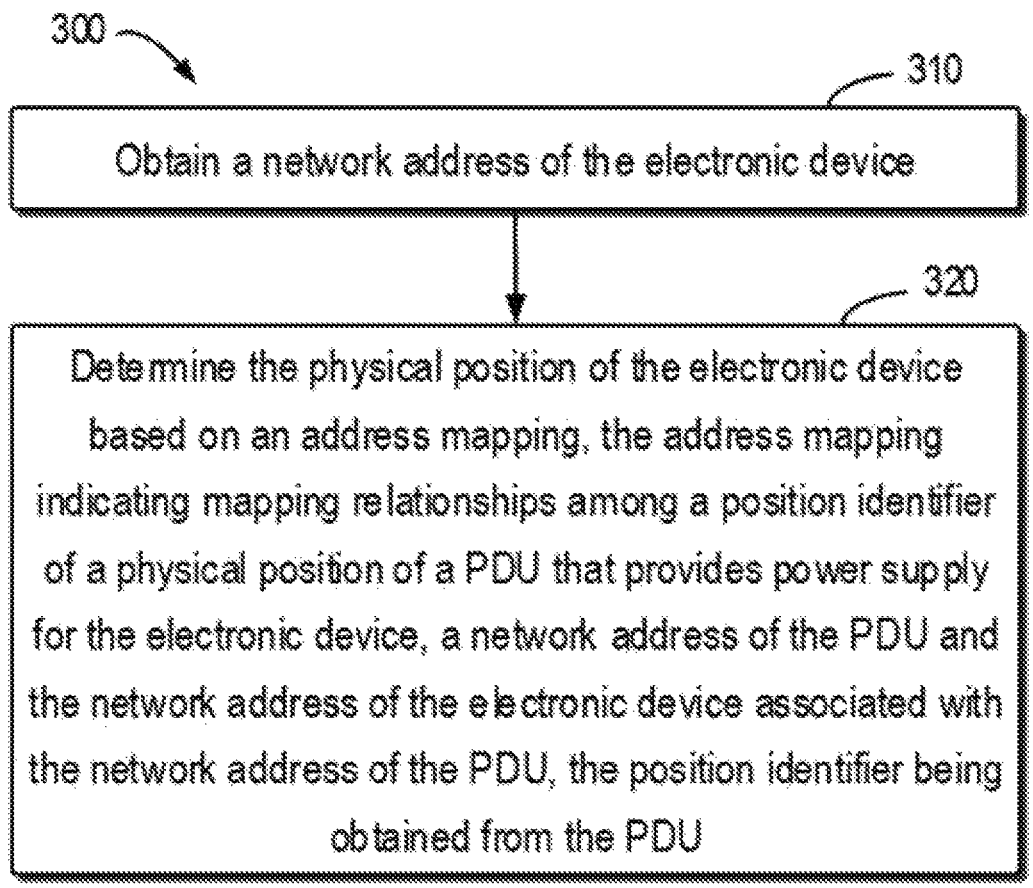
FIG. 3 shows a flowchart of a method of determining a physical position of an electronic device as implemented in a computing device according to an embodiment of the present disclosure.

To at least partially solve the foregoing and other potential drawbacks and problems of traditional schemes, embodiments of the present disclosure propose to leverage a radio frequency (RF) tag to record the physical position of a PDU that provides power supply for an electronic device and provide the physical position to a computing device via the PDU so that the computing device determines the physical position of the electronic device. Therefore, determination of the physical position of the electronic device by tracking a dynamic network address is realized at a lower cost. With reference to FIGS. 1 to 3, detailed description is presented below to the embodiments of the present disclosure.

FIG. 1 shows a block diagram of an environment 100 in which the embodiments of the present disclosure may be implemented. As shown in FIG. 1, the environment 100 comprises a computing device 110, an electronic device 120, a PDU 130, a RF tag reader 140 and a RF tag 150.

The computing device 110 is configured to manage or otherwise control operations of the electronic device 120 and the PDU 130. In some embodiments, the computing device 110 may communicate with the electronic device 120 according to the Intelligent Platform Management Interface (IPMI) protocol. In some embodiments, the computing device 110 may communicate with the PDU 130 according to the Inter-Integrated Circuit (PC) protocol. It is to be appreciated that this is merely exemplary and not intended to limit the scope of the present disclosure. In other embodiments, the computing device 110 may communicate with the electronic device 120 and the PDU 130 according to any other protocol that is currently known or to be developed later.

Examples of the computing device 110 may include, but are not limited to, a server, a desktop computer (PC), a laptop computer, and a tablet computer.

Examples of the electronic device 120 may include, but are not limited to, a server, a storage device, a router, a switch, and a monitor.

The PDU 130 is configured to provide supply power for electronic device 120. In some embodiments, the PDU 130 may include a controller and a memory coupled to the controller. As a non-limiting example, the controller may include a microcontroller unit (MCU). The memory may store computer program instructions which, when executed by the controller, may cause the PDU 130 to operate according to the example embodiments of the present disclosure.

It is to be appreciated that FIG. 1 only show one electronic device 120 and one PDU 130 for the purpose of illustration. However, according to a concrete application scenario, there may exist any appropriate number of electronic devices and PDUs. For example, in a data center, there may be several thousand or even thousands of electronic devices, and also there may be several thousand PDUs supplying power to these electronic devices. Furthermore, in the data center, a rack 160 may be used to facilitate the management and placement of the electronic device 120 and the PDU 130. Usually, the rack 160 may include multiple rack units, each of which may have one or more electronic devices placed thereon. Depending on the number of electronic devices placed on the rack 160, an appropriate number of PDUs may be placed on the rack 160 so as to provide supply power to these electronic devices.

The RF tag 150 is configured to store a position identifier of the physical position of the PDU 130. A RF tag writer (not shown) may be leveraged, to write the position identifier to the RF tag in advance. A method for writing the position identifier to the RF tag 150 may be implemented using any appropriate technique that is currently available, which is not described in detail herein. Examples of the RF tag 150 may include, but are not limited to, a near field communication (NEC) tag and a radio frequency identification (RFID) tag.

The RE tag reader 140 may be in wireless communication with the RF tag 150 so as to obtain from the RE tag 150 a position identifier stored therein. In this regard, the RF tag reader 140 may comprise an RF interface configured to communicate with the RF tag 150 in a wireless way. As an example, examples of the RF tag reader 140 may include, but are not limited to, an NEC tag reader and an RFID tag reader.

The RE tag reader 140 may further communicate with the PDU 130 so as to provide a position identifier obtained from the RE tag 150 to the PDU 130, for example. In this regard, the RE tag reader 140 may further comprise an additional interface for communicating with the PDU 130. As an example, the RF tag reader 140 may communicate with the PDU 130 according to the I²C protocol. In such an embodiment, the additional interface is configured to be an I²C interface. This is merely exemplary and not intended to limit the embodiments of the present disclosure. The RF tag reader 140 may communicate with the PDU 130 according to any further protocol that is currently known or to be developed later. In this regard, the RE tag reader 140 may comprise an additional interface conforming to the further protocol that is currently known or to be developed later.

In the case where the rack 160 is employed, the RE tag reader 140 may be placed in any appropriate position on the rack 160. The RE tag 150 may be placed in a position where wireless communication with the RF tag reader 140 is enabled. In some embodiments, the RF tag reader 140 may be placed on a baseplate of the rack 160, and the RF tag 150 may be placed on the floor close to the baseplate. In other embodiments, the RF tag reader 140 may be placed on a side plate of the rack 160, and the RF tag 150 may be placed on a wall close to the side plate. Of course, this is merely exemplary and not intended to limit the embodiments of the present disclosure.

In the case where the rack 160 is not employed, the RF tag reader 140 may be placed in any appropriate position where communication with the PDU 130 is enabled, and the RF tag 150 may be placed, in a position where wireless communication with the RF tag reader 140 is enabled. The scope of the present disclosure is not limited in this regard, FIG. 2 shows a flowchart of a method 200 of determining a physical position of an electronic device according to an embodiment of the present disclosure. For example, the method 200 may be implemented by the PDU 130 as shown in FIG. 1. It is to be understood the method 200 may further comprise an additional step that is not shown and/or omit a step that is shown, and the scope of the present disclosure is not limited in this regard.

The method 200 starts at block 210 where the PDU 130 providing supply power for the electronic device 120 obtains a position identifier of the physical position of the PDU 130 from the RF tag reader 140. The position identifier may include a multi-level description of the physical position of the PDU 130. As an example, the position identifier may include a name of a city, a building, the floor, or a room where the PDU 130 is located, or the number of the rack where the PDU 130 is located, and the like. For example, the position identifier may be "Hopkinton171.B1.F2.R5", wherein "Hopkinton171" represents the name of the city (i.e. Hopkinton) where the PDU 130 is located, "B1" represents the name of the building (i.e. building #1), "F2" represents the floor (i.e. floor #2), and "R5" represents the rack number (i.e. rack #5). It may be understood that the above described position identifier is merely exemplary, and it is also feasible to use any other type of position identifier.

The RF tag reader 140 may be powered by the PDU 130. Therefore, in some embodiments, in response to the PDU 130 being enabled to provide supply power for the RF tag reader 140, the RF tag reader 140 obtains from the RF tag 150 a position identifier written thereto. Further, the RF tag reader 140 provides the obtained position identifier to the PDU 130.

At block 220, the PDU 130 provides the position identifier to the computing device 110 so that the computing device 110 determines the physical position of the electronic device 120. As described above with reference to FIG. 1, the PDU 130 may comprise a memory. Therefore, the PDU 130 may store the position identifier obtained from the RF tag reader 140 in its memory. After obtaining the position identifier from the RF tag reader 140, the PDU 130 may compare the obtained position identifier with a position identifier stored in its memory. If the obtained position identifier is different from the stored position identifier, the PDU 130 may provide the obtained position identifier to the computing device 110. In this way, it is ensured that the PDU 130 always provides a latest position identifier to the computing device 110.

Besides providing the obtained position identifier to the computing device 110, the PDU 130 further provides to the computing device 110 a network address of the PDU 130 and a network address of the electronic device 120 associated with the network address of the PDU 130 so that the computing device 110 determines the physical position of the electronic device 120.

The network address of the PDU 130 and the network address of the electronic device 120 may comprise Internet Protocol (IP) addresses. In particular, in an embodiment where the electronic device 120 is a server device, the network address of the electronic device 120 may be an IP address of a baseboard management controller (BMC) of the electronic device 120.

The PDU 130 may predetermine the network address of the electronic device 120, associate the network address of the electronic device 120 with that of the PDU 130, and store the two network addresses in its memory.

As an example implementation, the computing device 110 may send a control command to the electronic device 120 to instruct the electronic device 120 to change the power loading of the electronic device 120 according to a predetermined mode. For example, the control command may include a binary coding sequence which indicates the predetermined mode. The binary coding sequence may be generated by encoding the network address of the electronic device 120. The PDU 130 providing supply power for the electronic device 120 detects the power loading of the electronic device 120. In response to detecting the power loading of the electronic device 120 changes according to the predetermined mode, the PDU 130 determines the network address of the electronic device 120. Further, the PDU 130 associates the network address of the electronic device 120 with that of the PDU 130 and stores the two network addresses in its memory.

It is to be understood that the above discussed manner in which the PDU 130 determines the network address of the electronic device 120 is merely exemplary and not intended to limit the embodiments of the present disclosure. In other embodiments, it is also feasible to adopt other manners.

In the embodiments of the present disclosure, since the PDU provides the position identifier of its physical position, its network address together with the network address of the electronic device to the computing device, even where a dynamic network address allocation scheme is adopted, the physical position of the electronic device can still be determined by tracking a dynamic network address by using the embodiments of the present disclosure.

In addition, the PDU is a common device that provides power supply for the electronic device. With the embodiments of the present disclosure, the electronic device can be located only by adding the low-cost RF tag and reader to an existing data center environment.

The method of determining a physical position of an electronic device as implemented by the PDU 130 has been described with reference to FIG. 2. Accordingly, FIG. 3 shows a flowchart of a method 300 of determining a physical position of an electronic device as implemented at the computing device 110 according to an embodiment of the present invention. It is to be appreciated the method 300 may further comprise an additional step that is not shown and/or may omit a step that is shown. The scope of the embodiment of the present disclosure is not limited in this regard. Note several features and functions to be described with reference to FIG. 3 have been described with reference to the embodiment on the PDU side, so they are ignored here.

At block 310, the computing device 110 obtains a network address of the electronic device 120. As a non limiting implementation, the computing device 110 may send an IPMI command to the electronic device 120 to obtain the network address of the electronic device 120.

At block 320, the computing device 110 determines the physical position of the electronic device 120 based on an address mapping. As described above with reference to FIG. 2, the PDU 130 provides to the computing device 110 the position identifier of its physical position, its network address, as well as the network address of the electronic device 120 associated with the network address of the PDU 130. Thereby, the computing device 110 may establish an address mapping by using the position identifier, the network addresses of the PDU 130 and the electronic device 120 as provided by the PDU 130. Table 1 shows one example of the address mapping.

TABLE 1

| Position Identifier of Physical Position of PDU | PDU's IP | BMC IP of Electronic Device |
| --- | --- | --- |
| Hopkinton171.B1.F2.R5 | 10.243.65.15 | 10.243.65.11 |

As seen from Table 1, the address mapping indicates mapping relationships among the position identifier of the PDU's physical position, the PDU's network address as well as the network address of the electronic device. Based on the address mapping as shown in Table 1, the computing device 110 may determine from the network address of the electronic device 120 the physical position (i.e. rack #5 in floor #2 of building #1 in Hopkinton city) of the PDU that provides power supply for the electronic device 120. Further, the computing device 110 may determine the PDU's physical position as the physical position of the electronic device 120.

It is to be appreciated that for the purpose of explanation, Table 1 shows address mapping entries for one electronic device. In case of multiple electronic devices, corresponding address mapping entries for multiple electronic devices may be added to Table 1 for determining physical positions of the electronic devices.

In the embodiment of the present disclosure, the computing device obtains the position identifier of the physical position of the PDU that serves as a common device for supplying power to the electronic device, the PDU's network address as well as the network address of the electronic device, so as to establish an address mapping among them. Therefore, with the embodiments of the present disclosure, even where a dynamic network address allocation scheme is adopted, the physical position of the electronic device can still be determined by tracking a dynamic network address.

Figure 4:
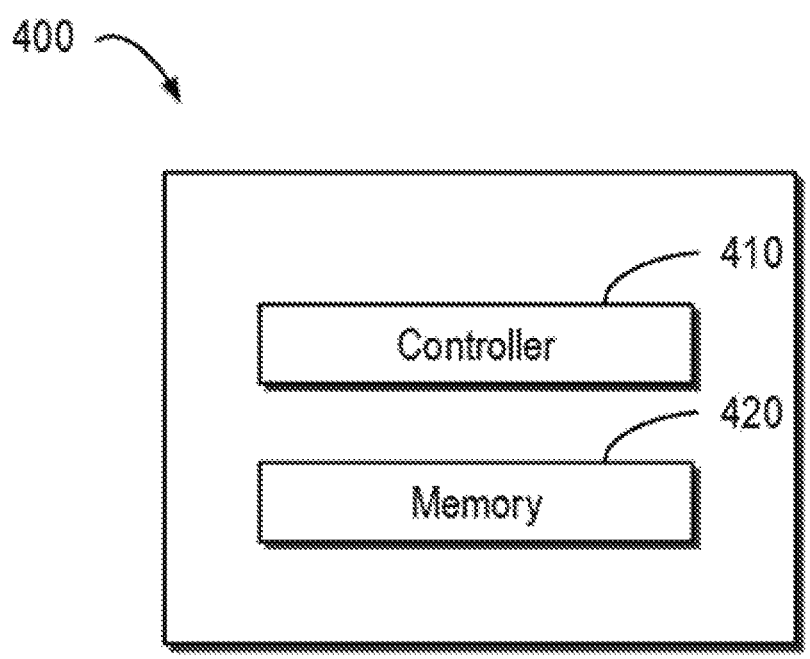
FIG. 4 shows a block diagram of a PDU according to an embodiment of the present disclosure.

The embodiments of the present disclosure further provide a PDU. FIG. 4 shows a block diagram of a PDU 400 according to an embodiment of the present disclosure. The PDU 400 may be implemented as the PDU 130 shown in FIG. 1.

The PDU 400 comprises a controller 410 and a memory 420. The memory 420 is coupled to controller 410 and stores instructions to be executed by the controller 410. The instructions, when executed by the controller 410, cause the PDU 400 to: obtain a position identifier of a physical position of the PDU 400 from an RF tag reader and provide to a computing device the position identifier, a network address of the PDU 400, as well as a network address of an electronic device associated with the network address of the PDU 400 so that the computing device determines the physical position of the electronic device.

In some embodiments, obtaining the position identifier from the RF tag reader comprises: in response to the PDU being enabled to supply power to the RF tag reader, obtaining the position identifier from the RF tag reader.

In some embodiments, obtaining the position identifier from the RF tag reader comprises obtaining the position identifier from at least one of the following: a near field communication (NFC) tag reader and a radio frequency identification (RFID) tag reader.

In some embodiments, providing the position identifier comprises: in response to the obtained position identifier being different from a position identifier that is stored in the PDU, providing the obtained position identifier.

Figure 5:
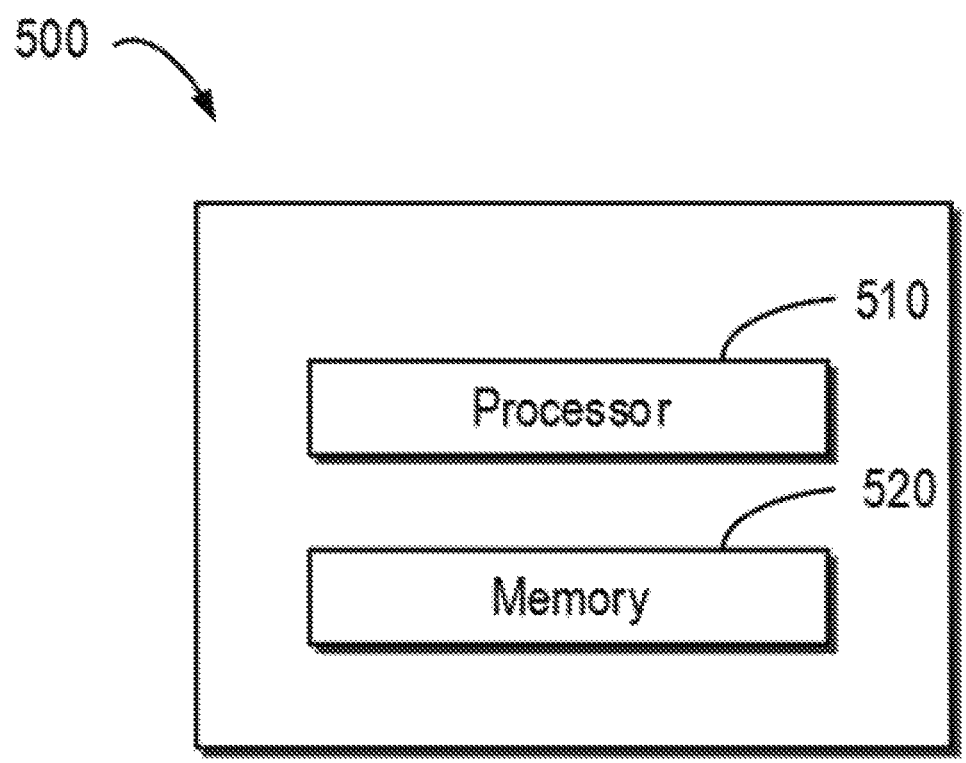
FIG. 5 shows a block diagram of a computing device according to an embodiment of the present disclosure.

The embodiments of the present disclosure further provide a computing device. FIG. 5 shows a block diagram of a computing device 500 according to an embodiment of the present disclosure. The computing device 500 may be implemented as the computing device 110 shown in FIG. 1.

The computing device 500 comprises at least one processor 510 and at least one memory 520. The at least one memory 521) is coupled to the at least one processor 510 and stores instructions to be executed by the at least one processor 510. The instructions, when executed by the at least one processor 510, cause the computing device 500 to: obtain a network address of an electronic device; and determine a physical position of the electronic device based on an address mapping, the address mapping indicating mapping relationships among a position identifier of a physical position of a PDU that provides power supply for the electronic device, a network address of the PDU and the network address of the electronic device associated with the network address of the PDU, the position identifier being obtained from the PDU.

For the clarity purpose, some modules of the PDU 400 and the computing device 500 are not shown in FIGS. 4 and 5. However, it should be understood that various features described with reference to FIGS. 1 to 3 are also applicable to the PDU 400 and the computing device 500. Moreover, various modules of the PDU 400 and the computing device 500 may be hardware modules or software modules. For example, in some embodiments, the PDU 400 and the computing, device 500 may be implemented partially or completely with software and/or firmware, for example, implemented as a computer program product embodied on a computer readable medium. Alternatively or additionally, the PDU 400 and the computing device 500 may be implemented partially or completely with hardware, for example, implemented as an integrated circuit (IC) chip, application-specific integrated circuit (ASIC), system on chip (SOC), field programmable gate array (FPGA) etc. The scope of the present invention is not limited in this regard.

Figure 6:
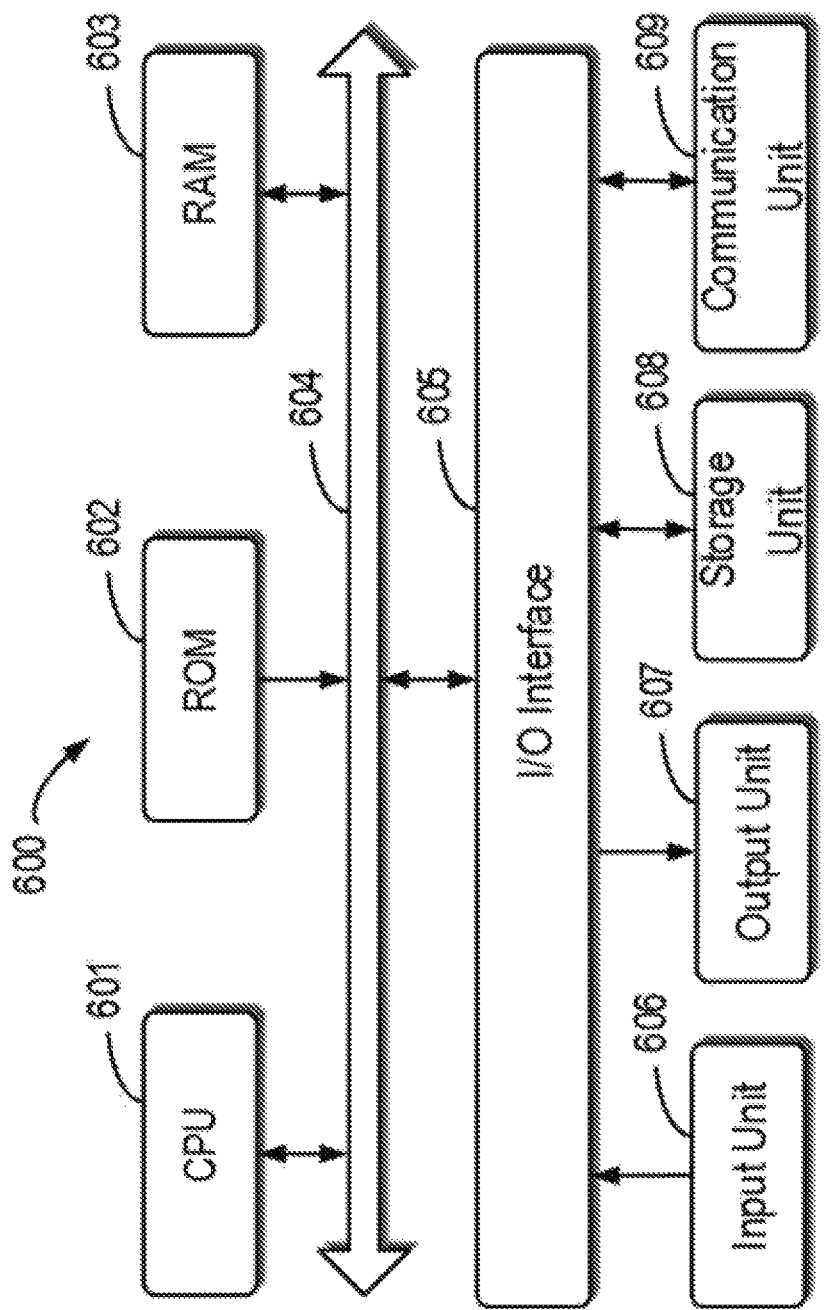
FIG. 6 shows a schematic block diagram of an exemplary device which is applicable to implement the embodiments of the present invention.

FIG. 6 illustrates a schematic block diagram of an exemplary device 600 which is applicable to implement the embodiments of the present disclosure. As illustrated in FIG. 6, the device 600 includes: Central Process Unit (CPU) 601, which may execute various, appropriate actions and treatment according to computer program instructions stored in Read Only Memory (ROM) 602 or computer program instructions loaded from a memory unit 608 to Random Access Memory (RAM) 603. In the RAM 603, there may be stored various programs and data needed by operations of the device 600. The CPU 601, ROM 602 and RAM 603 are coupled to one another via a bus 604. An input/output (I/O) interface 605 is also coupled to the bus 604.

Multiple components in the device 600 are coupled to the I/O interface 605, including: an input unit 606, such as a keyboard, a mouse, etc.; an output unit 607, such as various types of displays and loudspeakers, etc.; a memory unit 608, such as a magnetic disk, an optical disk, etc.; and a communication unit 609, such as an Internet card, a modem, a wireless communication transceiver, etc. The communication unit 609 allows the device 600 to exchange information/data with other device by means of a computer network such as the Internet and/or various telecommunication networks.

Various processes and treatment described above, for example, the method 200 and/or 300, may be executed by a processing unit 601. For example, in some embodiment, the method 200 and/or 300 may be implemented as a computer software program, which is tangibly embodied on a machine readable medium such as the memory unit 608. In some embodiments, part or all of the computer program may be loaded and/or installed to the device 600 via the ROM 602 and/or the communication unit 609. The computer program, when loaded to the RAM 603 and executed by the CPU 601, may perform one or more steps of the method 200 and/or 300 described above. Alternatively, in other embodiments, the CPU 601 may also be configured in any other appropriate manner so as to implement the method 200 and/or 300.

The present disclosure may be a method, apparatus, system and/or computer program product. The computer program product may include a computer readable storage medium having computer readable program instructions for executing various aspects of the present disclosure carried thereon.

The computer readable storage medium may be a tangible device that may hold and store instructions used by an instruction execution device. The computer readable storage medium may be, for example, but not limited to, an electronic, magnetic, optical, electromagnetic, or semiconductor storage device or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanical coding device such as a punch card having instructions stored thereon, or any suitable combination of the foregoing. The computer readable storage medium used here is not interpreted as an instantaneous signal itself, such as a radio wave or other freely propagated electromagnetic wave, electromagnetic wave propagated through a waveguide or other transmission medium (such as an optical pulse through an optical fiber cable), or an electric signal transmitted through an electric wire).

The computer readable program instructions described here may be loaded from the computer readable storage medium to various computing/processing devices, or loaded to an external computer or external storage device via a network such as the Internet, a local area network, a wide area network and/or a wireless network. The network may comprise a copper transmission cable, optical transmission, wireless transmission, router, firewall, switch, gateway computer and/or edge server. The network adapter card or network interface in each computing/processing device receives computer readable program instructions from the network and forwards the computer readable program instructions so as to be stored in computer readable storage media in various computing/processing devices.

The computer program instructions used for executing operations of the present disclosure may be assembly instructions, instruction set architecture (ISA) instructions, machine instructions, machine-related instructions, micro code, firmware instructions, status setting data, or source code or target code written in one or more programming languages, including an object oriented programming language such as Smalltalk, C++ or the like and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry may be customized using status information of the computer readable program instructions, such as programmable logic circuit, field programmable gate array (FPGA) or programmable logic array (PLA), which electronic circuitry may execute the computer readable program instructions and thereby implement various aspects of the present disclosure.

Aspects of the present disclosure are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of determining a physical position of an electronic device, comprising:
   configuring a power distribution unit (PDU) to provide a power supply for the electronic device and a power supply for a radio frequency (RF) tag reader, the PDU storing a first position identifier of a physical position of the PDU in a memory thereof;
   storing a second position identifier of the physical position of the PDU on an RF tag associated with the PDU;
   obtaining, by the RF tag reader, the second position identifier from the RF tag;
   obtaining, by the PDU, the second position identifier from the RF tag reader;
   comparing the second position identifier to the first position identifier;
   determining that the second position identifier is different from the first position identifier; and
   providing to a computing device the second position identifier, a network address of the PDU, and a network address of the electronic device associated with the network address of the PDU for determining the physical position of the electronic device by the computing device;
   wherein one or more of the network address of the PDU and the network address of the electronic device are dynamically allocated;
   wherein the PDU associates the network address of the PDU with the network address of the electronic device;
   wherein, in determining the physical position of the electronic device, the computing device establishes a mapping indicating relationships among the second position identifier, the network address of the PDU, and the network address of the electronic device; and
   wherein the mapping comprises at least one address mapping table, the address mapping table comprising a first entry for the electronic device and a plurality of additional entries for respective ones of a plurality of additional electronic devices, the entry for a given one of the electronic devices comprising at least one position identifier of a physical position of a PDU associated with the given electronic device, a network address of the PDU associated with the given electronic device, and a network address of the given electronic device.

2. The method according to claim 1, wherein obtaining the second position identifier from the RF tag reader comprises:
   in response to the PDU being enabled to provide the power supply for the RF tag reader, obtaining the second position identifier from the RF tag reader.

3. The method according to claim 1, wherein obtaining the second position identifier from the RF tag reader comprises:
   obtaining the second position identifier from at least one of:
   a near field communication (NFC) tag reader, and
   a radio frequency identification (RFID) tag reader.

4. The method according to claim 1, wherein the PDU determines the network address of the electronic device in response to detecting a power loading change of the electronic device.

5. The method according to claim 4, wherein:
   the computing device transmits a control command to the electronic device to instruct the electronic device to change the power loading of the electronic device; and
   the control command includes a binary coding sequence generated by encoding the network address of the electronic device.

6. The method according to claim 1, wherein the network address of the given electronic device comprises a network address of a management controller for the given electronic device.

7. A method of determining a physical position of an electronic device, comprising:
   configuring a power distribution unit (PDU) to provide a power supply for the electronic device and a power supply for a radio frequency (RF) tag reader, the PDU storing a first position identifier of a physical position of the PDU in a memory thereof;
   storing a second position identifier of the physical position of the PDU on an RF tag associated with the PDU;
   obtaining, by the RF tag reader, the second position identifier from the RF tag;
   obtaining, by the PDU, the second position identifier from the RF tag reader;
   comparing the second position identifier to the first position identifier;
   determining that the second position identifier is different from the first position identifier;
   obtaining a network address of the electronic device; and
   determining the physical position of the electronic device based on an address mapping;
   wherein the determining comprises:
   establishing the address mapping indicating relationships among the second position identifier, a network address of the PDU, and the network address of the electronic device associated with the network address of the PDU;
   wherein one or more of the network address of the PDU and the network address of the electronic device are dynamically allocated;
   wherein the PDU associates the network address of the PDU with the network address of the electronic device; and
   wherein the mapping comprises at least one address mapping table, the address mapping table comprising a first entry for the electronic device and a plurality of additional entries for respective ones of a plurality of additional electronic devices, the entry for a given one of the electronic devices comprising at least one position identifier of a physical position of a PDU associated with the given electronic device, a network address of the PDU associated with the given electronic device, and a network address of the given electronic device.

8. The method according to claim 7, wherein the PDU determines the network address of the electronic device in response to detecting a power loading change of the electronic device.

9. The method according to claim 8, further comprising transmitting a control command to the electronic device to instruct the electronic device to change the power loading of the electronic device, wherein the control command includes a binary coding sequence generated by encoding the network address of the electronic device.

10. The method according to claim 7, wherein the PDU obtains the second position identifier from the RF tag reader in response to the PDU being enabled to provide the power supply for the RF tag reader.

11. The method according to claim 10, wherein the RF tag reader comprises at least one of a near field communication (NFC) tag reader, and a radio frequency identification (RFID) tag reader.

12. The method according to claim 7, wherein the electronic device comprises one of a server, a storage device, a router, a switch, and a monitor.

13. The method according to claim 7, wherein the network address of the given electronic device comprises a network address of a management controller for the given electronic device.

14. A power distribution unit (PDU) for providing a power supply for an electronic device, comprising:
a controller; and
a memory coupled to the controller and storing a first position identifier of a physical position of the PDU;
wherein a radio frequency (RF) tag associated with the PDU stores a second position identifier of the physical position of the PDU;
wherein the memory cooperates with the controller to cause the PDU:
to provide the power supply for the electronic device;
to provide a power supply for a radio frequency (RF) tag reader, wherein the RF tag reader obtains the second position identifier from the RF tag;
to obtain the second position identifier from the RF tag reader;
to compare the second position identifier to the first position identifier;
to determine that the second position identifier is different from the first position identifier; and
to provide to a computing device the second position identifier, a network address of the PDU, and a network address of the electronic device associated with the network address of the PDU for determining the physical position of the electronic device by the computing device;
wherein one or more of the network address of the PDU and the network address of the electronic device are dynamically allocated;
wherein the PDU associates the network address of the PDU with the network address of the electronic device; and
wherein, in determining the physical position of the electronic device, the computing device establishes a mapping indicating relationships among the second position identifier, the network address of the PDU, and the network address of the electronic device; and
wherein the mapping comprises at least one address mapping table, the address mapping table comprising a first entry for the electronic device and a plurality of additional entries for respective ones of a plurality of additional electronic devices, the entry for a given one of the electronic devices comprising at least one position identifier of a physical position of a PDU associated with the given electronic device, a network address of the PDU associated with the given electronic device, and a network address of the given electronic device.

15. The PDU according to claim 14, wherein obtaining the second position identifier from the RF tag reader comprises:
in response to the PDU being enabled to provide the power supply for the RF tag reader, obtaining the second position identifier from the RF tag reader.

16. The PDU according to claim 14, wherein obtaining the second position identifier from the RF tag reader comprises:
obtaining the second position identifier from at least one of:
a near field communication (NFC) tag reader, and
a radio frequency identification (RFID) tag reader.

17. The PDU according to claim 14, wherein the memory coupled to the controller and cooperating with the controller further causes the PDU to determine the network address of the electronic device in response to detecting a power loading change of the electronic device.

18. The PDU according to claim 17, wherein:
the computing device transmits a control command to the electronic device to instruct the electronic device to change the power loading of the electronic device; and
the control command includes a binary coding sequence generated by encoding the network address of the electronic device.

19. The PDU according to claim 14, wherein the network address of the given electronic device comprises a network address of a management controller for the given electronic device.

20. The PDU according to claim 14, wherein the electronic device comprises one of a server, a storage device, a router, a switch, and a monitor.

* * * * *